(12) United States Patent
Murray et al.

(10) Patent No.: US 10,146,464 B2
(45) Date of Patent: Dec. 4, 2018

(54) METHOD FOR PERFORMING MULTIPLE ENROLLMENTS OF A PHYSICALLY UNCLONEABLE FUNCTION

(71) Applicant: NXP B.V., Eindhoven (NL)

(72) Inventors: Bruce Murray, Hamburg (DE); Helmut Alexander Goettl, Hamburg (DE); Sven Heine, Pinneberg (DE); Christiaan Kuipers, Eindhoven (NL)

(73) Assignee: NXP B.V., Eindhoven (NL)

( * ) Notice: Subject to any disclaimer, the term of this patent is extended or adjusted under 35 U.S.C. 154(b) by 184 days.

(21) Appl. No.: 15/198,104

(22) Filed: Jun. 30, 2016

(65) Prior Publication Data

US 2018/0004444 A1   Jan. 4, 2018

(51) Int. Cl.
| | |
|---|---|
| *H04L 29/06* | (2006.01) |
| *G06F 21/00* | (2013.01) |
| *G06F 3/06* | (2006.01) |
| *H04L 9/08* | (2006.01) |
| *G09C 1/00* | (2006.01) |

(52) U.S. Cl.
CPC .......... *G06F 3/0622* (2013.01); *G06F 3/0629* (2013.01); *G06F 3/0673* (2013.01); *G09C 1/00* (2013.01); *H04L 9/0861* (2013.01); *H04L 9/0866* (2013.01)

(58) Field of Classification Search
CPC .... G06F 3/0622; G06F 3/0629; G06F 3/0673; H04L 9/0861
See application file for complete search history.

(56) References Cited

U.S. PATENT DOCUMENTS

| | | | |
|---|---|---|---|
| 8,339,875 B2 | 12/2012 | Tuyls et al. | |
| 8,699,714 B2 | 4/2014 | Tuyls et al. | |
| 8,700,916 B2* | 4/2014 | Bell | H04L 9/0866 380/44 |
| 8,918,647 B1* | 12/2014 | Wallrabenstein | H04L 63/0853 713/159 |
| 8,983,067 B2* | 3/2015 | Murray | H04L 9/0866 380/44 |
| 9,214,183 B2 | 12/2015 | Van Rijnswou | |
| 2007/0180261 A1 | 8/2007 | Akkermans et al. | |

(Continued)

*Primary Examiner* — Lisa C Lewis
(74) *Attorney, Agent, or Firm* — Daniel D. Hill (57) ABSTRACT

A data processing system having a PUF and method for providing multiple enrollments, or instantiations, of the PUF are provided. A PUF segment includes a plurality of SRAM cells on an integrated circuit. A PUF response from the PUF segment is used to create a first activation code and a first PUF key. A second PUF key may be created from the PUF response. Initially, during a second enrollment, the PUF response is combined with the first activation code to reproduce a codeword. The first secret string is reconstructed by encoding the codeword. The codeword is combined with the first activation code to reproduce the PUF response. Inverse anti-aging is applied to the PUF response. Then a second secret string is generated using a random number generator (RNG). The second secret string is encoded to produce a new codeword. The new codeword is combined with the recovered PUF response to create a second activation code. The second activation coded is hashed with the second secret string to provide a second PUF key.

20 Claims, 6 Drawing Sheets

(56) References Cited

U.S. PATENT DOCUMENTS

| | | | |
|---|---|---|---|
| 2009/0083833 A1* | 3/2009 | Ziola | G06F 21/31 |
| | | | 726/2 |
| 2010/0127822 A1 | 5/2010 | Devadas | |
| 2011/0215829 A1* | 9/2011 | Guajardo Merchan | G06F 7/588 |
| | | | 326/8 |
| 2012/0131340 A1 | 5/2012 | Teuwen et al. | |
| 2012/0179952 A1* | 7/2012 | Tuyls | G06F 21/73 |
| | | | 714/768 |
| 2014/0189365 A1* | 7/2014 | Cox | G06F 21/72 |
| | | | 713/189 |
| 2014/0195815 A1* | 7/2014 | Taveau | G06F 21/32 |
| | | | 713/186 |
| 2014/0258736 A1* | 9/2014 | Merchan | G06F 21/62 |
| | | | 713/193 |
| 2015/0188718 A1* | 7/2015 | Falk | G09C 1/00 |
| | | | 380/278 |
| 2015/0278505 A1 | 10/2015 | Lu et al. | |
| 2017/0237573 A1* | 8/2017 | Goettfert | G06F 21/72 |
| | | | 713/193 |
| 2018/0006813 A1* | 1/2018 | Van Der Leest | H04L 9/0866 |

* cited by examiner

METHOD FOR PERFORMING MULTIPLE ENROLLMENTS OF A PHYSICALLY UNCLONEABLE FUNCTION

BACKGROUND

Field

This disclosure relates generally to physically uncloneable functions and more specifically to a method for performing multiple enrollments of a physically uncloneable function (PUF).

Related Art

A physically uncloneable function (PUF) is a physical system that will produce an unpredictable response when a stimulus is input. An example of a PUF uses a static random access memory (SRAM). SRAM cells are bi-stable, meaning that they only have two stable states. When powered up, the bi-stable SRAM cell will settle in one of the two stable states. Because a conventional SRAM is normally symmetrical, the state it will be in when powered-up is unpredictable. A portion, or segment, of an SRAM can be used as a PUF for generating an encryption key. When being used as a key, the PUF may be initialized/enrolled during the first time a device is powered up to create an activation code, or helper data, and the PUF derived keys. Manufacturing variations and other factors may cause some of the cells of the PUF to power-up in different states at different times. Because of this variability, it is necessary to preserve the initial PUF response.

Figure 1:
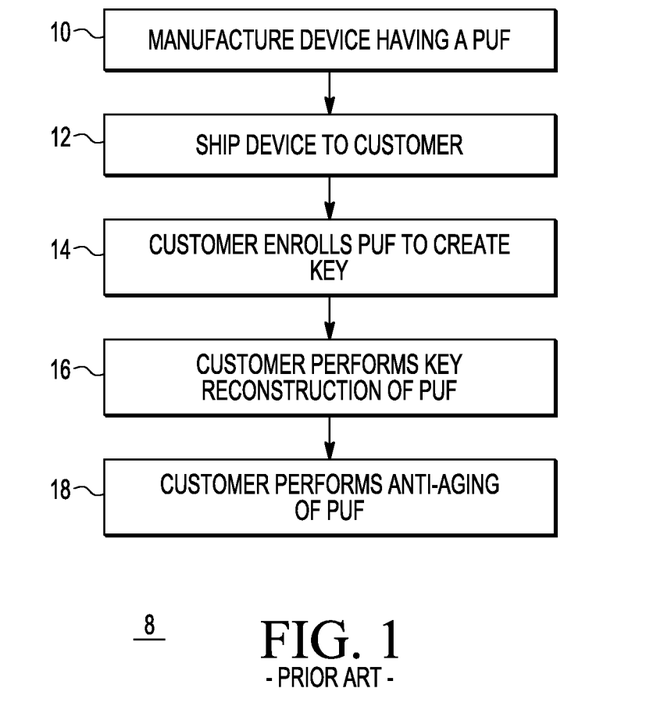
FIG. 1 illustrates a method in accordance with the prior art.

A simplistic conventional approach to implementing a PUF is illustrated in FIG. 1. In FIG. 1, a method 8 includes a step 10 where a device having a PUF is manufactured. At step 12, the device is shipped to a customer. A customer who wants to create a key using the PUF will enroll the PUF as in step 14. Enrollment is the process that creates the PUF key. After enrollment, and when the PUF key is needed, the PUF key is reconstructed as in step 16. Each time the PUF key is needed, it is reconstructed from the PUF response so that no key is stored on the device. If the key is reconstructed often, the effects of physical semiconductor migration may cause the SRAM cells of the PUF to initialize in a state opposite the state that has been stored for a long time. This will affect the ability to recreate the PUF response when the key is needed. At step 18, a customer may perform anti-aging to preserve the initial PUF response from physical semiconductor migration effects.

There are circumstances when it would be desirable to provide a multiple enrollment PUF to allow multiple parties to have access to separate secure areas of a system. For example, a manufacturer may need access to boot/flash-loader functionality that requires initialization of a key using the PUF functionality. Proposals for multiple PUF instantiations already exist where multiple physical SRAM segments are used to implement multiple PUFs. However, the cost of this solution is extra dedicated hardware. Therefore, a need exists for multiple concurrent PUF instantiations that use a single PUF segment.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a data processing system having a PUF and method for providing multiple enrollments, or instantiations, of the PUF so that secure areas of an integrated circuit device can be accessed by multiple parties without compromising the security of any of the parties. A PUF segment includes a plurality of SRAM cells on an integrated circuit. A PUF response from the PUF segment is used to create a first activation code, or first helper data, and a first PUF key. The first activation code is stored in secure memory. The first PUF key can be reconstructed as necessary for encryption/decryption. Anti-aging may be applied to preserve the PUF response.

In accordance with an embodiment, a second PUF key may be created from the PUF response. Initially, when creating the second PUF key, the PUF response is combined with the first activation code to reproduce a codeword. The PUF response may have errors that are corrected using error correction techniques. A first secret string is reconstructed by encoding the codeword. The codeword is combined with the first activation code to reproduce the PUF response. Anti-aging may have been used to prevent the problem associated with storing the same logic state for extended periods. Inverse anti-aging is required to reproduce the PUF response. However, even if anti-aging is not used in the first enrollment, according to the presently described embodiment, anti-aging is first applied, and then inverse anti-aging is required to reproduce the PUF response. Then a second secret string is generated using a random number generator (RNG). The second secret string is encoded to produce a codeword. The codeword is combined with the recovered PUF response to create a second activation code, or second helper data. The second activation code is stored in secure storage. The second activation coded is hashed with the second secret string to provide a second PUF key.

Creating a second PUF key using the same PUF segment eliminates the need for extra dedicated hardware on an integrated circuit, thus reducing cost.

In one embodiment, there is provided, in a system comprising a physically uncloneable function (PUF), wherein the PUF has been initialized with a first enrollment to produce a PUF response, a first activation code, and a first PUF key, a method for a second enrollment of the PUF to produce a second PUF key, the method comprising: combining the first activation code with the PUF response to reproduce a codeword used in the first enrollment; reconstructing a first secret string used in the first enrollment by encoding the reproduced codeword; combining the first activation code with the reproduced codeword to reproduce the PUF response; generating a second secret string using a random number generator; encoding the second secret string to produce a new codeword; combining the new codeword with the PUF response to create a second activation code; and hashing the second secret string with the second activation code to provide the second PUF key. The PUF may be a portion of a static random access memory (SRAM) array, and wherein the PUF response may be output from the portion of the SRAM array. The first activation code may be stored in a memory characterized as being secure. Combining the first activation code with the PUF response may further comprise using an exclusive-OR logical operation for the combining. The method may further comprise: inverting the PUF response to produce an inverted PUF response; and inverting the inverted PUF response to recover the PUF response. After the second enrollment, a method is provided for a second reconstruction to reconstruct the second PUF key, the method may comprise: combining the second activation code with the PUF response to reproduce the new codeword; reconstructing the second secret string by encoding the new codeword; and hashing the reconstructed second secret string with the second activation code to reproduce the second PUF key. Wherein combining the first activation code with the PUF response to produce a codeword may further comprise applying error correction to the reproduced codeword. The method may be embodied in software stored in non-transitory storage media on an integrated circuit.

In another embodiment, there is provided, a method for creating first and second keys from a physically uncloneable function (PUF) on an integrated circuit, the method comprising: initializing the PUF to produce a PUF response; generating a first secret string using a random number generator; encoding the first secret string to produce a codeword; combining the codeword with the PUF response to create a first activation code; hashing the first activation code with the first secret string to provide the first key; combining the first activation code with the PUF response to reproduce the codeword; reconstructing a first secret string by encoding the reproduced codeword; combining the first activation code with the reproduced codeword to reproduce the PUF response; generating a second secret string using a random number generator; encoding the second secret string to produce a new codeword; combining the new codeword with the PUF response to create a second activation code; and hashing the second secret string with the second activation code to provide the second key. The method may be embodied in software stored in non-transitory storage media on the integrated circuit. The PUF may be a portion of a static random access memory (SRAM), and wherein the PUF response may be output from the portion of the SRAM. The first and second activation codes may be stored in memory on the integrated circuit, wherein the memory may be characterized as being secure. Each of the steps of combining may further comprise using an exclusive-OR operation to do the combining. The method may further comprise applying error correction to the reproduced codeword. The method may further comprise: applying anti-aging to the PUF response; and applying inverse anti-aging to the anti-aged PUF response.

In yet another embodiment, a data processing system having a physically uncloneable function (PUF), wherein the PUF has been initialized to produce a PUF response, a first activation code, and a first PUF key, instructions for producing a second PUF key, the instructions stored in non-transitory storage media and comprising: instructions for combining the first activation code with the PUF response to reproduce a codeword; instructions for reconstructing a first secret string used in the first enrollment by encoding the reproduced codeword; instructions for combining the first activation code with the reproduced codeword to reproduce the PUF response; instructions for generating a second secret string using a random number generator; instructions for encoding the second secret string to produce a new codeword; instructions for combining the new codeword with the PUF response to create a second activation code; and instructions for hashing the second secret string with the second activation code to provide the second PUF key. The PUF may be a portion of a static random access memory (SRAM). The data processing system may further comprise: instructions for applying anti-aging to the PUF response; and instructions for applying inverse anti-aging the anti-aged PUF response. The first and second activation codes may be stored in memory, wherein the memory may be characterized as being secure. The data processing system may further comprise instructions for applying error correction to the reproduced codeword.

Figure 2:
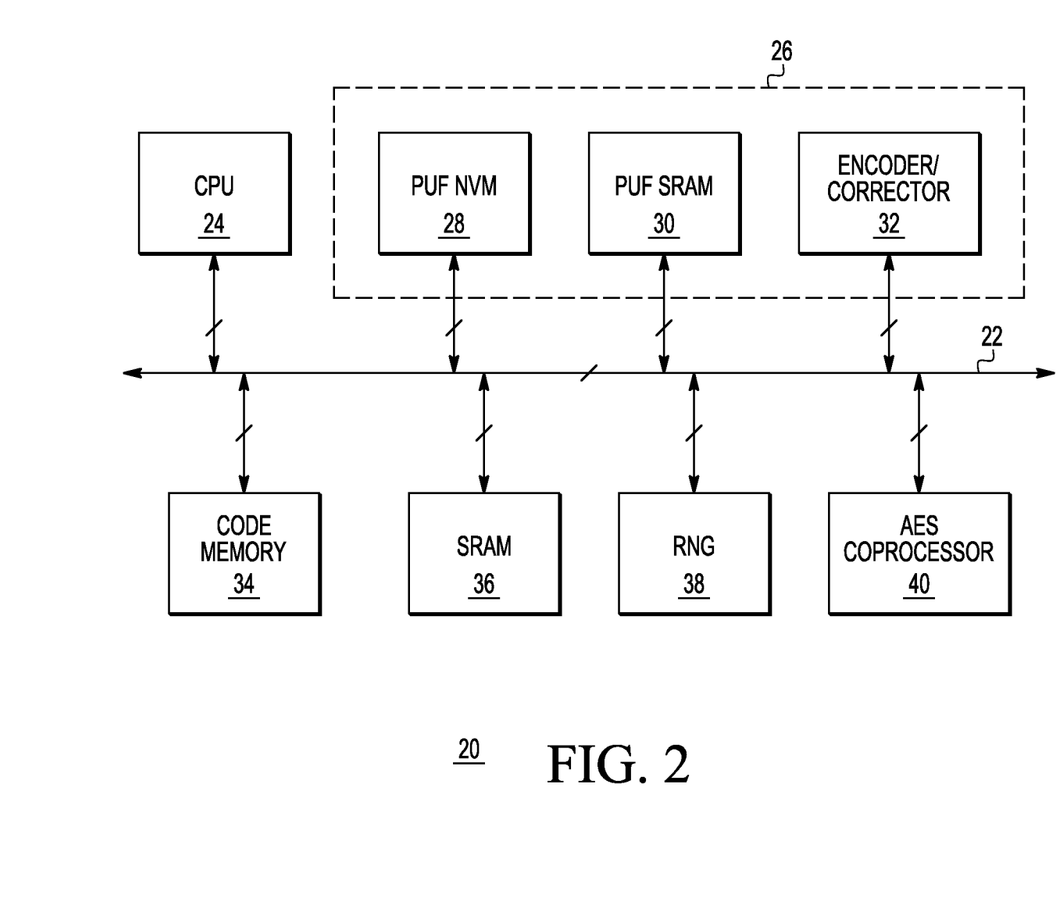
FIG. 2 illustrates an integrated circuit data processing system having a PUF in accordance with an embodiment.

FIG. 2 illustrates an integrated circuit data processing system 20 having a PUF in accordance with an embodiment. In one embodiment, data processing system 20 is a system-on-a-chip (SoC) implemented on a single integrated circuit. Data processing system 20 includes bus 22, central processing unit (CPU) 24, secure area 26, code memory 34, static random access memory (SRAM) 36, random number generator (RNG) 38, and AES coprocessor 40. Secure area 26 includes PUF non-volatile memory (NVM) 28, PUF SRAM 30, and encoder/corrector 32. Bus 22 may be a conventional bus having a plurality of conductors for communicating address, data, and control information. In other embodiments, bus 22 may be an interconnect structure such as for example, a cross-bar switch or other form of SoC interconnect system. Central processing unit 24 is bi-directionally connected to bus 22. Central processing unit 24 may include one or more of any type of processing element, a processor core, microprocessor, microcontroller, digital signal processor, and the like. There can be any number of processors. PUF NVM 28 is bi-directionally connected to bus 22. PUF NVM 28 can be any type of non-volatile memory such as flash, one-time programmable (OTP), EEPROM (electrically eraseable programmable read only memory), and the like. PUF NVM 28 may be used to provide secure storage for the first and second activation codes discussed below as well as for other data that would benefit from secure storage. Various types of security may be used to protect PUF NVM 28 including encryption and obfuscation. PUF SRAM 30 is bi-directionally connected to bus 22. At least a portion of PUF SRAM 30 is used to provide the PUF response used to generate one or more PUF keys as discussed below. Encoder/corrector 32 is bi-directionally connected to bus 22. The encoder portion of encoder/corrector 32 may provide the encoding steps in accordance with the methods described below. The Corrector may include ECC (error correction code), redundancy, and other types of error correction techniques for correcting recovered codewords and PUF responses that might have errors. Code memory 34 is bi-directionally connected to bus 22 and provides storage for the instructions used in the illustrated embodiments. SRAM 36 is bi-directionally connected to bus 12. Random number generator (RNG) 38 is bi-directionally connected to bus 22 and may be a true random number generator (TRNG). AES coprocessor 40 is bi-directionally connected to bus 12 and is a coprocessor optimized for running encryption/decryption security software according to the Advanced Encryption Standard or other type of encryption. AES may be used to encrypt/decrypt data and instructions in data processing system 10.

Figure 3:
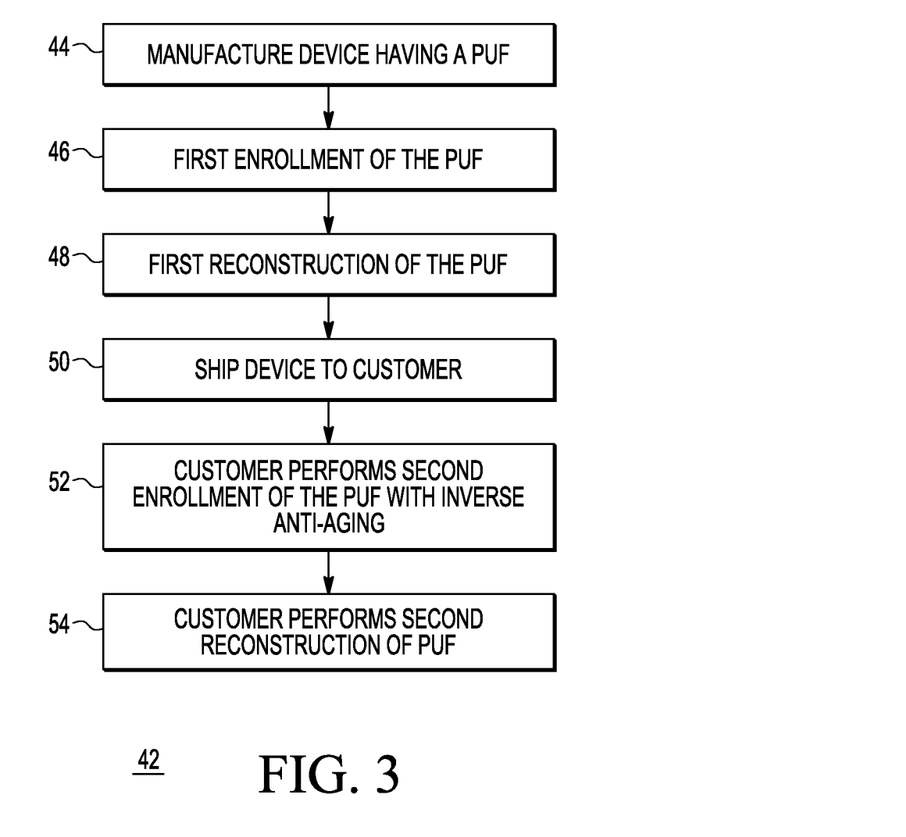
FIG. 3 illustrates a flowchart of a method for multiple enrollment of the PUF of the data processing system of FIG. 2.
Figure 5:
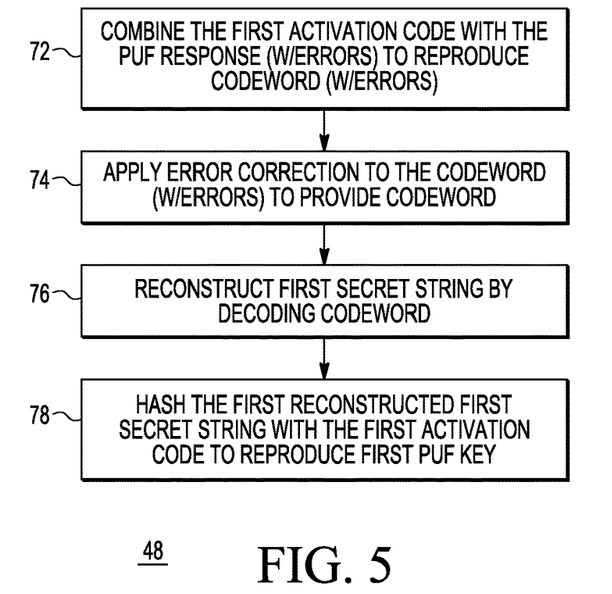
FIG. 5 illustrates a flowchart of a method of the first reconstruction of the method of FIG. 3.
Figure 6:
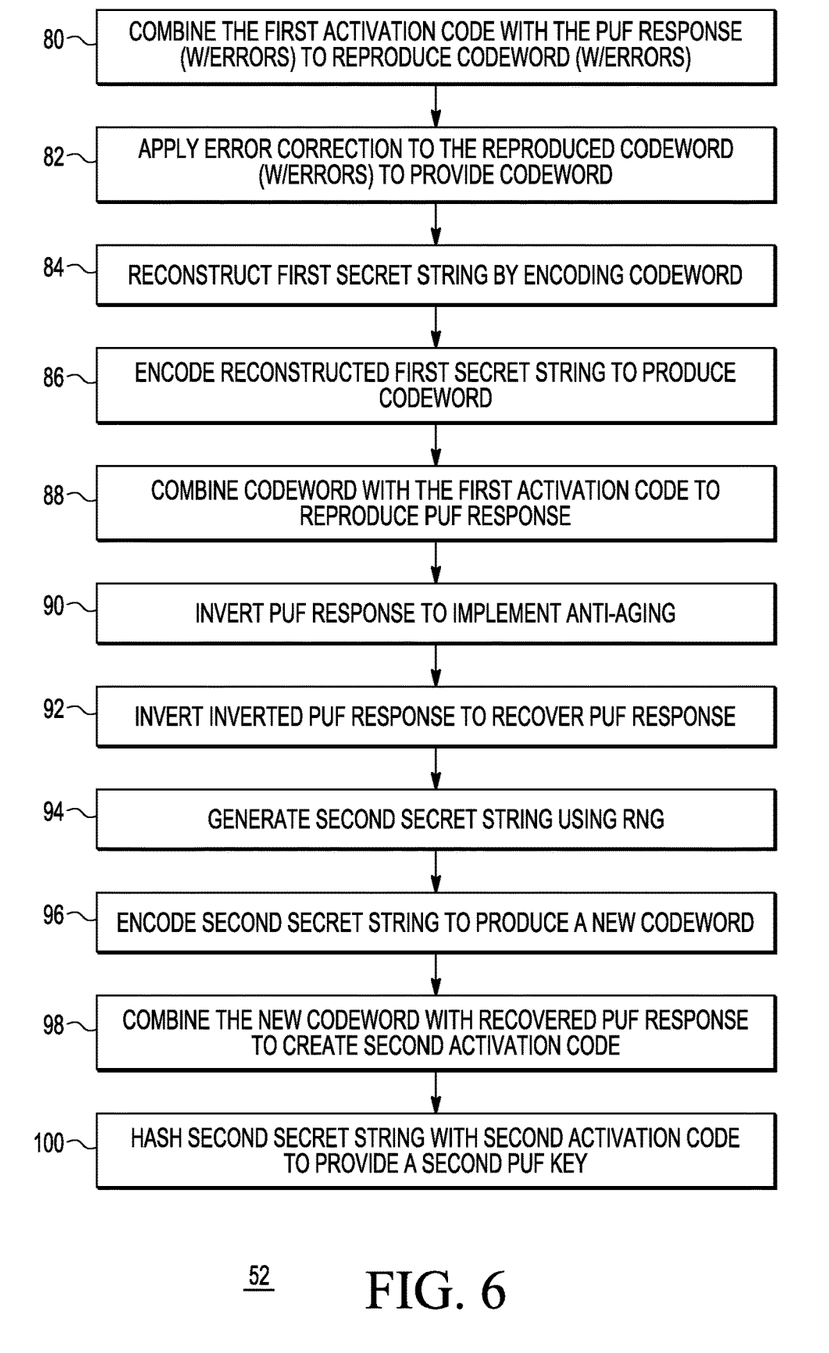
FIG. 6 illustrates a flowchart of a method of the second enrollment of the method of FIG. 3.
Figure 7:
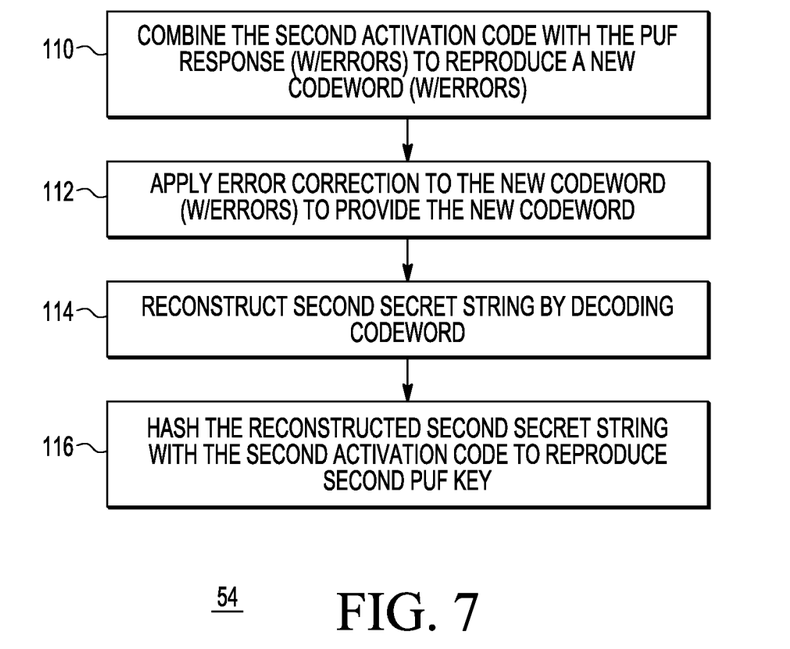
FIG. 7 illustrates a flowchart of a method of the second reconstruction of the method of FIG. 3.

FIG. 3 illustrates a flowchart of a method 42 for multiple enrollments of the PUF of the data processing system of FIG. 2. In method 42, at step 44, an integrated circuit device having data processing system 20 is manufactured using a conventional semiconductor manufacturing process. At step 46, a first enrollment of the PUF is performed. The first enrollment generates a PUF response and uses the PUF response to generate a first PUF key. The steps for the first enrollment in accordance with an embodiment are provided in FIG. 4. The manufacturer of the device having the PUF may perform step 46. At step 48, a first reconstruction of the PUF is performed. The manufacturer of the device having the PUF may perform step 48 to recover the first PUF key to access boot/flashloader functions and other functionality that requires initialization of a key using the PUF functionality. Each time the first PUF key is needed, first reconstruction method 48 is performed. The steps of method 48 are illustrated in FIG. 5. At step 50, the device is sold and shipped to a customer. At step 52, the customer performs a second enrollment of the PUF to create a second PUF key. The customer may also implement anti-aging according to the second enrollment. The steps of the method of step 52 is illustrated in FIG. 6. At step 54, the customer may perform the second reconstruction of the PUF to recover the second PUF key when necessary. The steps of the method of step 54 are illustrated in FIG. 7. Portions of method 42 may be embodied as computer instructions that are stored non-transitory storage media such as any one or more of the memories in data processing system 20.

Figure 4:
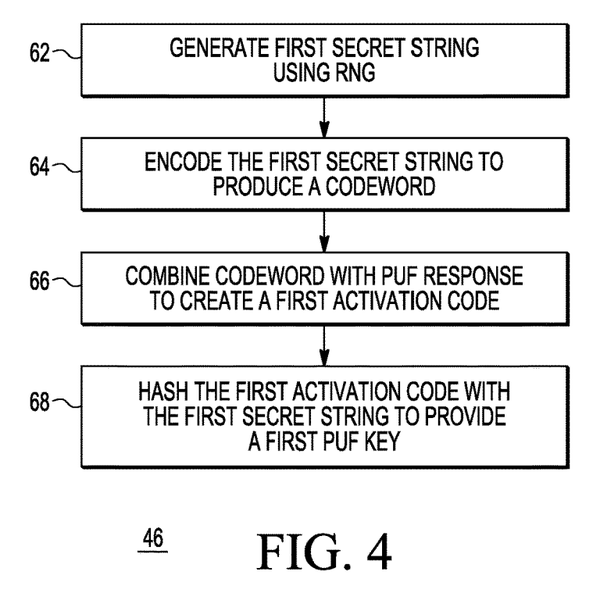
FIG. 4 illustrates a flowchart of a method of the first enrollment of the method of FIG. 3.

FIG. 4 illustrates a flowchart of method 46 of the first enrollment of the method of FIG. 3. At step 62, of the first enrollment, a first secret string of bits is generated using a random number generator (RNG) such as RNG 38 in FIG. 2. Preferably, the RNG is a true random number generator (TRNG). The number of bits in the first secret string is not important for purposes of describing the invention and may be different in different embodiments. At step 64, the first secret string is encoded using encoder/corrector 32 to produce a codeword. At step 66, the codeword is combined with the PUF response using an exclusive-OR operation to create a first activation code, or first helper data. The first activation code is stored in PUF NVM 28 in secure area 26. Encryption and/or obfuscation may be applied to the first activation code to provide additional protection. In other embodiments, the first activation code may be stored differently, for example, in unsecure storage. At step 68, the first activation code is hashed with the first secret string to provide a first PUF key.

FIG. 5 illustrates a flowchart of method 48 of the first reconstruction of the method of FIG. 3. The first reconstruction method 48 is used anytime it is necessary to recover the first PUF key. At step 72, the first activation code is output from the secure memory location, for example, PUF NVM 28, and combined with the PUF response using an exclusive-OR operation to reproduce the codeword. Different operating conditions may cause PUF SRAM 30 to provide a PUF response that has some bits different than when the PUF was first enrolled. Therefore, error correction may be applied using encoder/corrector 32 to correct the erroneous bits (step 74) of the resulting recovered codeword. At step 76, the first secret string is reconstructed by decoding the codeword. At step 78, the reconstructed first secret string is hashed with the first activation code to reproduce the first PUF key. It is assumed the manufacturer will perform the first enrollment and the first reconstructions and that the first PUF key will not be used often by the manufacturer. Anti-aging the PUF response may not be necessary but could be performed at this time to help preserve the PUF response.

FIG. 6 illustrates a flowchart of a method 52 of the second enrollment of the method of FIG. 3. The second enrollment recovers the codeword, the first secret string, and the PUF response that were generated in the first enrollment method 46 of FIG. 4 to produce a second PUF key. At step 80, the first activation code is combined with the PUF response (with errors) using an exclusive-OR operation to reproduce the codeword (with errors). At step 82, error correction is applied to the reproduced codeword to provide a corrected codeword. At step 84, the codeword, as corrected, is encoded to reconstruct the first secret string that was first generated in step 62 in FIG. 4. At step 86, the reconstructed first secret string is encoded to produce the codeword that was first produced at step 64 in FIG. 4. At step 88, the reconstructed codeword is combined with the first activation code using an exclusive-OR operation to reproduce the PUF response that was first output from PUF SRAM 30 to create the first PUF key. At step 90, the PUF response is inverted as when implementing anti-aging. At step 92, another inversion of the inverted PUF response recovers the PUF response. At step 94, a second secret string is generated using RNG 38. Random number generator 38 may preferably be a true random number generator (TRNG). At step 96, the second secret string is encoded to produce a new codeword. At step 98, the new codeword is combined with the recovered PUF response to create a second activation code, or second helper data. The second activation code may be stored in a secure memory such as PUF NVM 28. However, because the first and second activation codes are combined with their respective PUF responses to reproduce the PUF key, and the PUF response is inherently secure, then arguably secure storage is not necessary for the activation codes. At step 100, the second secret string is hashed with the second activation code to provide the second PUF key.

FIG. 7 illustrates a flowchart of method 54 of the second reconstruction of the method of FIG. 3. The second reconstruction of FIG. 7 is similar to the first reconstruction of FIG. 5. At step 110, the second activation code is combined using an exclusive-OR operation with the PUF response (with errors) to reproduce a new codeword (with errors). At step 112, the error correction of encoder/corrector 32 is applied to the new codeword (with errors) to provide the codeword. At step 114, the second secret string is reconstructed by decoding the codeword. At step 116, the reconstructed second secret string is hashed with the second activation code to reproduce the second PUF key.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in the above described embodiment, a current electrode is a source or drain and a control electrode is a gate of a metal-oxide semiconductor (MOS) transistor. Other transistor types may be used in other embodiments.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system comprising a physically uncloneable function (PUF), a method comprising:
    initializing the PUF with a first enrollment to produce a PUF response, a first activation code, and a first PUF key;
    combining, using a processor of the data processing system, the first activation code with the PUF response to reproduce a codeword used in the first enrollment;
    reconstructing, using the processor, a first secret string used in the first enrollment by encoding the reproduced codeword; combining, using the processor, the first activation code with the reproduced codeword to provide a reproduced PUF response that is substantially the same as the PUF response;
    generating a second secret string using a random number generator of the data processing system;
    encoding, using the processor, the second secret string to produce a new codeword;
    combining the new codeword with the reproduced PUF response, using the processor, to create a second activation code; and hashing the second secret string with the second activation code to provide a second PUF key, wherein the second PUF key is created using the same PUF as the first PUF key, and wherein the first and second PUF keys are used to make one or more portions of the data processing system securely accessible by multiple parties without compromising the security of any of the parties.

2. The method of claim 1, wherein the PUF is a portion of a static random access memory (SRAM) array, and wherein the PUF response is output from the portion of the SRAM array.

3. The method of claim 1, wherein the first activation code is stored in a memory characterized as being secure.

4. The method of claim 1, wherein combining the first activation code with the PUF response further comprises using an exclusive-OR logical operation for the combining.

5. The method of claim 1, further comprising:
    inverting the reproduced PUF response to produce an inverted reproduced PUF response; and
    inverting the inverted reproduced PUF response to recover the reproduced PUF response.

6. The method of claim 1, wherein after the second enrollment, a method for a second reconstruction to reconstruct the second PUF key, the method comprising:
    combining the second activation code with the reproduced PUF response to reproduce the new codeword;
    reconstructing the second secret string by encoding the new codeword; and
    hashing the reconstructed second secret string with the second activation code to reproduce the second PUF key.

7. The method of claim 1, wherein combining the first activation code with the PUF response to produce a codeword further comprises applying error correction to the reproduced codeword.

8. The method of claim 1, wherein the method is embodied in software stored in non-transitory storage media on an integrated circuit.

9. A method for creating first and second keys from a physically uncloneable function (PUF) on an integrated circuit, the method comprising:
    Initializing using a processor implemented on the integrated circuit, the PUF to produce a PUF response;
    generating a first secret string using a random number generator implemented on the integrated circuit;
    encoding, using the processor, the first secret string to produce a codeword;
    combining, using the processor, the codeword with the PUF response to create a first activation code;
    hashing, using the processor, the first activation code with the first secret string to provide the first key;
    combining, using the processor, the first activation code with the PUF response to provide a reproduced codeword that is substantially the same as the codeword;
    reconstructing, using the processor, a first secret string by encoding the reproduced codeword;
    combining, using the processor, the first activation code with the reproduced codeword to provide a reproduced PUF response that is substantially the same as the PUF response;
    generating a second secret string using a random number generator implemented on the integrated circuit;
    encoding, using the processor, the second secret string to produce a new codeword;
    combining, using the processor, the new codeword with the produced PUF response to create a second activation code; and
    hashing, using the processor, the second secret string with the second activation code to provide the second key, wherein the first and second keys are created using the same PUF, and wherein the first and second PUF keys are used to make one or more portions of the data processing system securely accessible by multiple parties without compromising the security of any of the parties.

10. The method of claim 9, wherein the method is embodied in software stored in non-transitory storage media on the integrated circuit to be executed by the processor.

11. The method of claim 9, wherein the PUF is a portion of a static random access memory (SRAM), and wherein the PUF response is output from the portion of the SRAM.

12. The method of claim 9, wherein the first and second activation codes are stored in memory on the integrated circuit, wherein the memory is characterized as being secure.

13. The method of claim 9, wherein each of the steps of combining further comprises using an exclusive-OR operation to do the combining.

14. The method of claim 9, further comprising applying error correction to the reproduced codeword.

15. The method of claim 9, further comprising:
applying anti-aging to the PUF response; and
applying inverse anti-aging to the anti-aged PUF response.

16. A data processing system having a physically uncloneable function (PUF), the instructions stored in non-transitory storage media and comprising:
initializing the PUF to produce a PUF response, a first activation code, and a first PUF key;
instructions for combining the first activation code with the PUF response to reproduce a codeword;
instructions for reconstructing a first secret string used in the first enrollment by encoding the reproduced codeword; instructions for combining the first activation code with the reproduced codeword to provide a reproduced PUF response that is substantially the same as the PUF response;
instructions for generating a second secret string using a random number generator;
instructions for encoding the second secret string to produce a new codeword; instructions for combining the new codeword with the reproduced PUF response to create a second activation code; and instructions for hashing the second secret string with the second activation code to provide a second PUF key, wherein the first and second PUF keys are created using the same PUF, and wherein the first and second PUF keys are used to make one or more portions of the data processing system securely accessible by multiple parties without compromising the security of any of the parties.

17. The data processing system of claim 16, wherein the PUF is a portion of a static random access memory (SRAM).

18. The data processing system of claim 16, further comprising:
instructions for applying anti-aging to the PUF response; and
instructions for applying inverse anti-aging the anti-aged PUF response.

19. The data processing system of claim 16, wherein the first and second activation codes are stored in memory, wherein the memory is characterized as being secure.

20. The data processing system of claim 16, further comprising instructions for applying error correction to the reproduced codeword.

* * * * *